Inventors
JERZY KOSMAN &
HORACE CARLTON DE GRUYTHER
By
Tweedale & Gerhardt
Attorneys

United States Patent Office 3,309,943
Patented Mar. 21, 1967

3,309,943
VEHICLE POWER UNIT
Jerzy Kosman, Kenilworth, and Horace C. De Gruyther, Coventry, England, assignors to Massey-Ferguson (United Kingdom) Limited, London, England, a British company
Filed Apr. 23, 1964, Ser. No. 361,962
Claims priority, application Great Britain, May 1, 1963, 17,185/63
11 Claims. (Cl. 74—701)

This invention relates to vehicle power units and more particularly to power units particularly suitable for use in light, agricultural tractors.

In the conventional tractor configuration, a front mounted engine and a generally centrally disposed transmission assembly provide drive to the rear wheels of the tractor through a separate differential gear. In relatively light weight tractors, the latter arrangement, in addition to being expensive, has the disadvantage that insufficient weight is distributed onto the rear wheels to obtain maximum traction.

An object of this invention is to provide a compact power unit for light weight tractors and similar vehicles in which the engine, transmission and differential gear are disposed in a single housing which can be removed as a unit from the tractor.

Another object is to provide a power unit for light weight tractors in which the engine, transmission and differential gear are supported as a single unit on the rear axles of the tractor to provide maximum traction.

Still another object is to provide a vehicle power unit including an engine, transmission and differential gear assembly mounted in a single housing that can be quickly and easily removed for servicing the various assemblies.

Yet another object is to provide a vehicle power unit having an improved lubrication system in which the scavenging pump for the crankcase may be utilized to pressure lubricate the transmission and other components.

The invention comprises a vehicle power unit including a differential gear having an input and two outputs, the outputs being adapted to be drivingly connected to a pair of wheel axles, a transmission or gear box having shafts disposed parallel to the axles and mounted in the housing close to and generally above the differential gear, an engine having a crankshaft parallel to the transmission shafts and to the axles, a pair of casings which together house the transmission gear box, differential gear and axles, and further including clutch means operable to connect and disconnect the drive from the engine to the axles through the transmission and differential gear.

A housing for the power unit is provided by right and left hand casings detachably connected along a plane parallel to the longitudinal plane of the vehicle with the transmission and differential shafts as well as the crankshaft disposed transversely to the longitudinal plane of the vehicle. A double acting lubrication pump means is provided for the power unit including a first pump means having its discharge connected so as to supply lubrication fluid to one part of the power unit, and a second pump means adapted to receive lubrication fluid from said one part of the vehicle power unit and having its discharge connected to supply lubrication fluid to another part of the vehicle transmission.

Other objects and advantages of the invention will become apparent from the following description taken in connection with the accompanying drawings in which.

Figure 1:
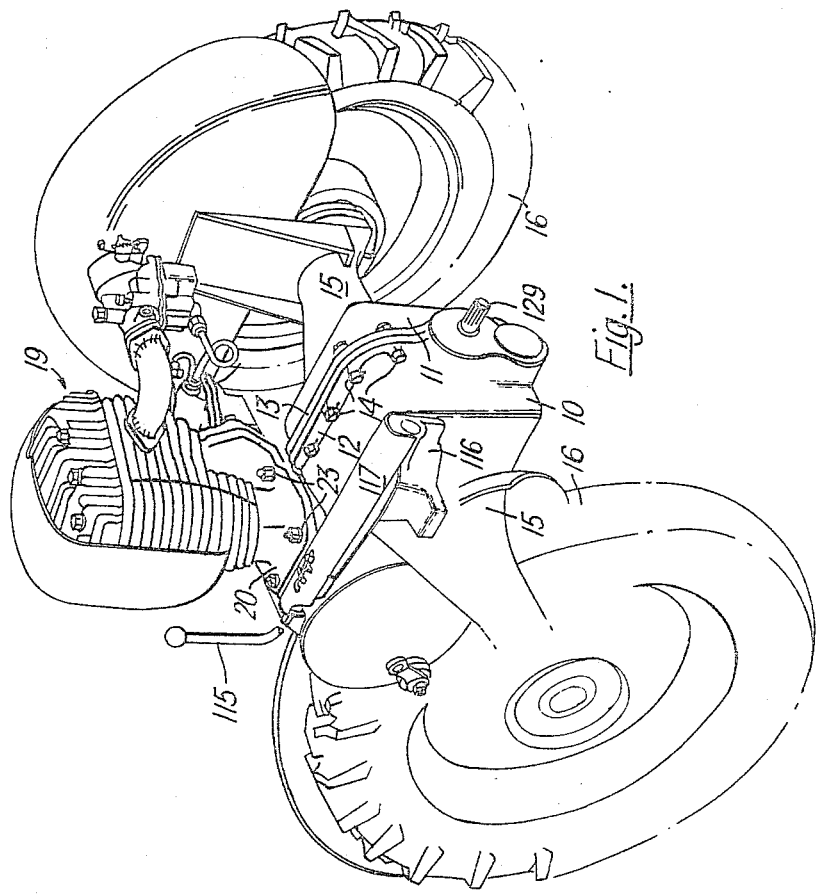
FIG. 1 is a perspective view from the rear of a tractor having a power unit embodying the invention.
Figure 2:
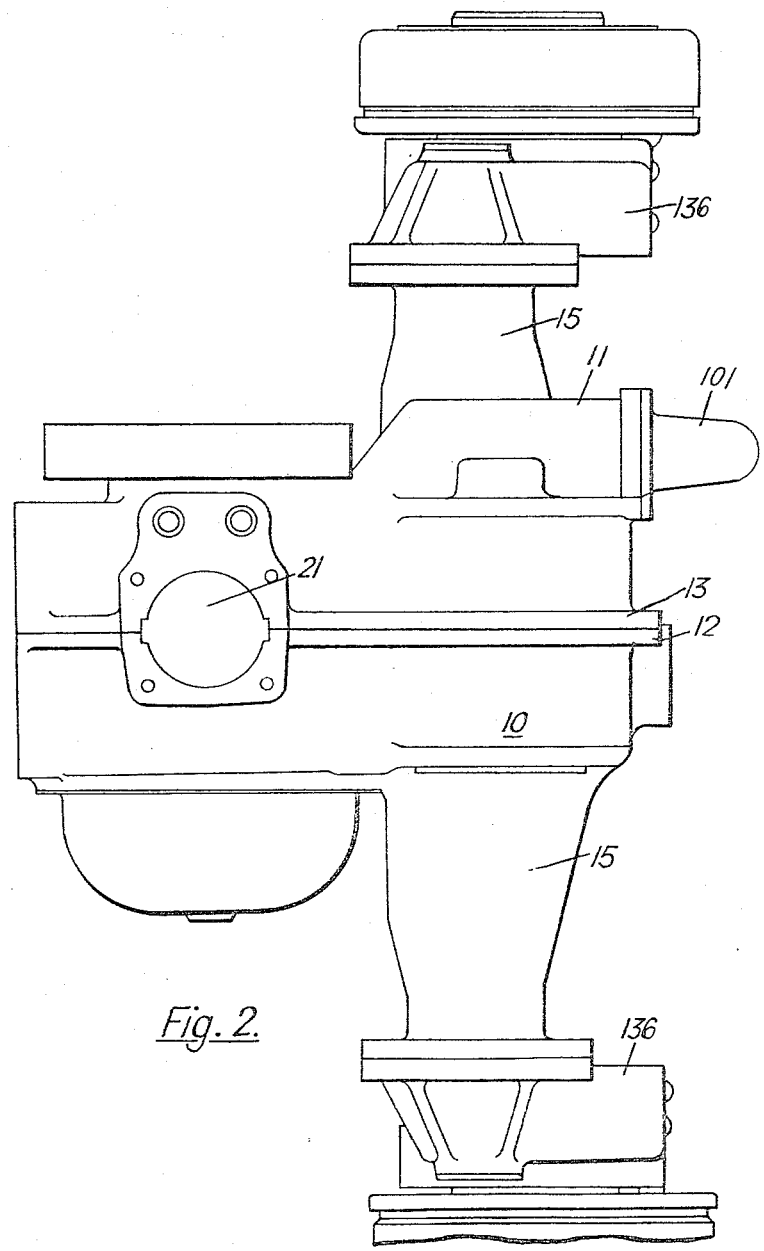
FIG. 2 is a plan view of the housing of a slightly modified unit with the engine block removed.

In FIGS. 1 and 2, the rear end of a tractor is shown including a power unit having left and right hand casings 10, 11. Casings 10 and 11 each have central housing portions at their inner ends formed with complementary rims or flanges 12, 13, respectively, through which bolts 14 (FIG. 1) are passed to secure the casings together. Each casing 10 and 11 includes a flared, tubular shaft housing, which may be referred to as the trumpet housing 15. With flanges 12, 13 secured together by bolts 14, the central housing portions cooperate to define a central housing for enclosing the engine crankshaft as well as the transmission shafts and differential gear and the tubular shaft housings 15 enclose the output of the differential unit in a manner to be presently described.

The tractor engine, which may, for example, be an air-cooled, single cylinder unit, includes a cylinder head or block 19 having a base plate 20 fitted over an aperture 21 (FIGS. 2 and 5) in the central housing of casings 10 and 11. The connecting rod 22 between the piston and crankshaft passes through aperture 21, and the engine block 19 is secured to the casings by bolts 23.

Figure 5:
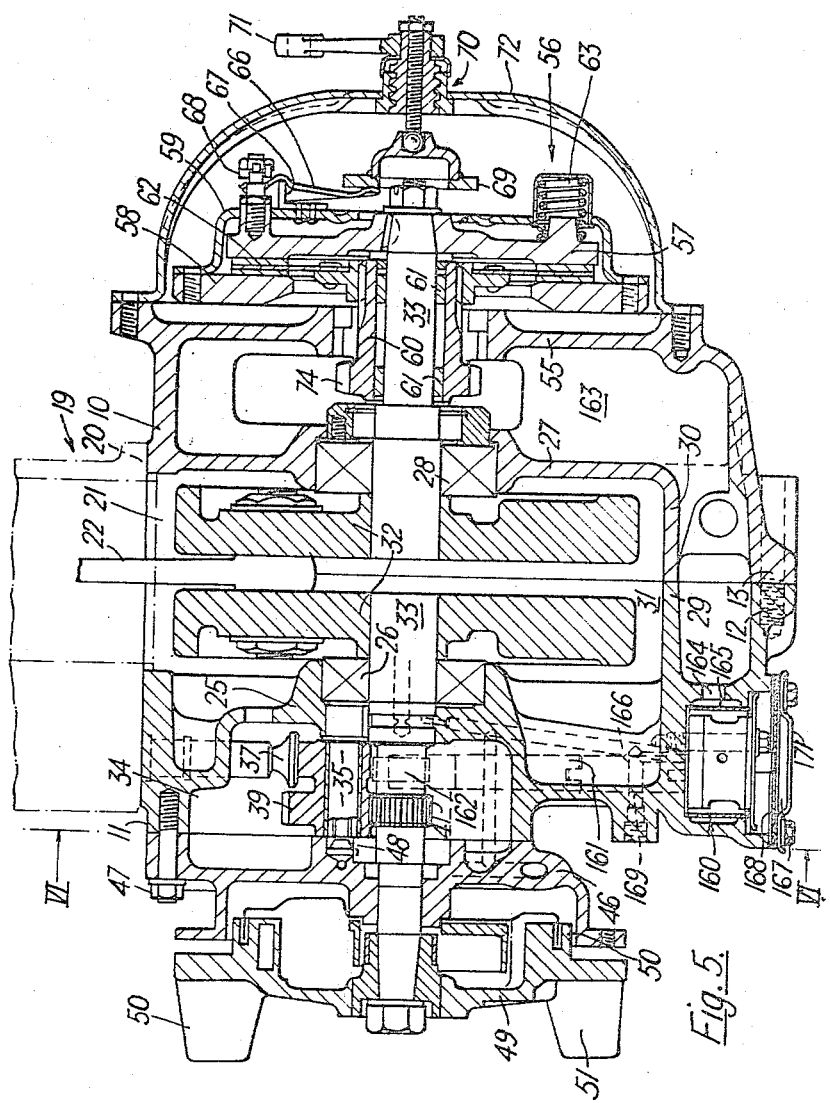
FIG. 5 is a sectional view taken on lines 5—5 of FIG. 6.

As shown in FIGURE 5, casing 11 is formed with an inwardly extending annular portion 25 which serves as the carrying member for a crankshaft bearing 26. Casing 10 is similarly formed with a portion 27 carrying the second crankshaft bearing 28. Portions 25 and 27 are formed with inwardly extending flanges 29 and 30, respectively, which cooperate to enclose a crankcase chamber 31 which receives the crank portion 32 of a transversely extending crankshaft 33.

Figure 6:
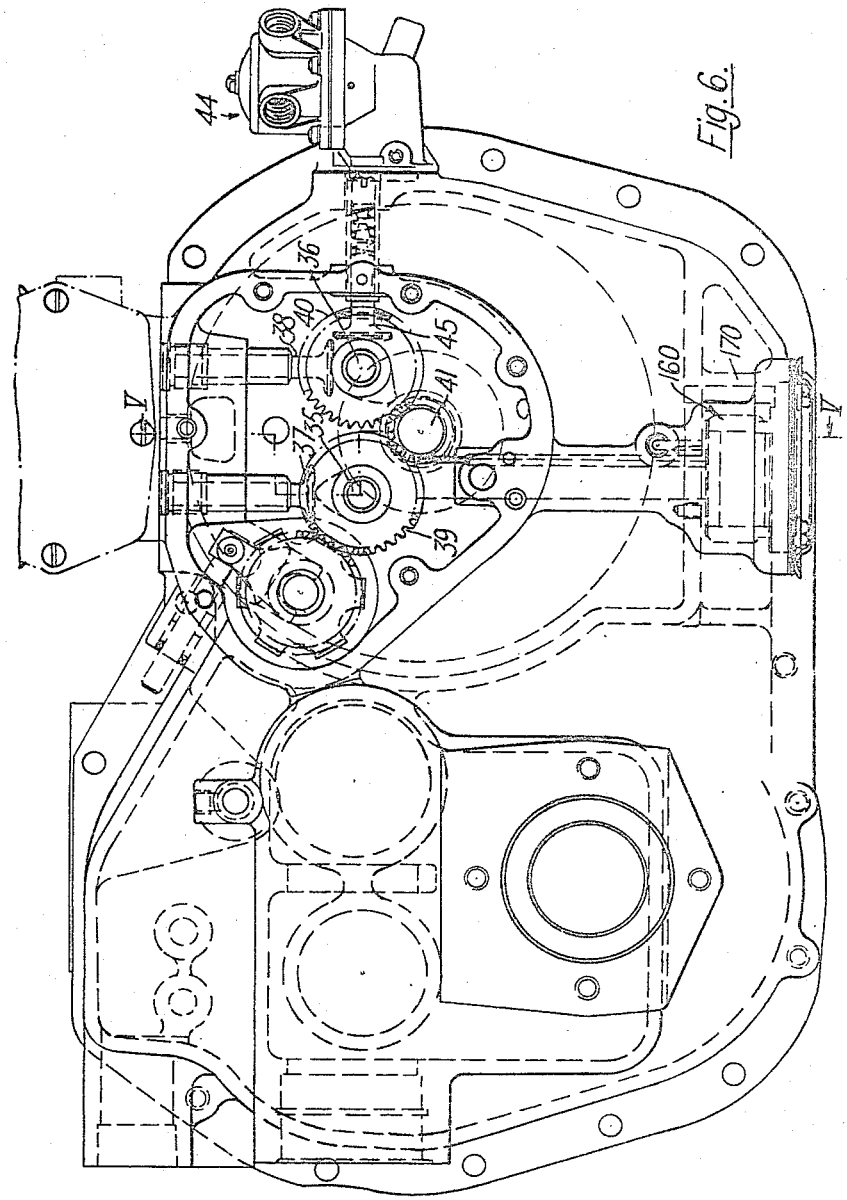
FIG. 6 is a sectional view taken on lines 6—6 of FIG. 5.

In FIG. 5, the left end of crankshaft 33 projects through annular portion 35 into a valve chamber or recess 34 provided in casing 11. Valve chamber 34 houses the engine valve driving gear including camshafts 35, 36 (FIG. 6) operating, respectively, the engine inlet and exhaust valves 37, 38. Camshafts 35, 36 carry gears 39, 40, respectively, each meshing with a gear 41 provided on the crankshaft. Additionally, as shown in FIG. 6, camshaft 36 drives a fuel pump 44 by means of a push rod 45.

Attached to casing 11 by bolts 47 is a clousure plate 46 for closing recess 34 and providing bearing points for camshafts 35 and 36. The crankshaft also extends through the closure plate 46 and carries on its outwardly projecting end in impeller 49 including a magneto rotor 50 and fan blades 51.

The right hand portion of crankshaft 33 (FIG. 5), projects through the outer wall 55 of casing 10 where it is keyed or otherwise rigidly connected with the driven member of a clutch assembly 56. Clutch 56 includes a first driving pressure plate 57 which is affixed to shaft 33, and a second pressure plate 58 which is connected for rotation with, but slidable axially relative to pressure plate 57 by means of an annular connecting plate 59. Mounted between pressure plates 57 and 58 is a clutch disc 62 which is splined to the outer end of a tubular, driven shaft 60. Shaft 60 is supported on bearings 61 mounted between the inner wall of shaft 60 and the outer surface of crankshaft 33. Spring 63 acting between pressure plate 57 and connecting plate 59 urges the pressure plates towards each other so that their driving surfaces contact the clutch disc to provide a frictional drive between crankshaft 33 and driven shaft 60.

Fulcrumed on a bracket 67 carried by plate 59 is a clutch actuating lever 66. Actuating lever 66 engages an abutment 68 at its outer end, abutment 68 being carried by pressure plate 57. At its inner end, lever 66 engages a thrust plate 69 threadedly supported in the outer wall of a cover plate 72 by means of an adjustable assembly 70 including an actuating lever 71. Lever 71 is connected to the clutch pedal (not shown). The arrangement is such that the thrust plate 69 is movable axially upon rotation of lever 71. Depression of the clutch pedal causes pressure plate 69 to move to the left as shown in FIG. 5, thereby separating pressure plate 58 from pressure plate 57 and freeing clutch disc 62 to disengage the drive.

With the foregoing arrangement of the clutch components, it is not necessary to separate the engine and gear box in order to adjust and repair the clutch. The clutch becomes accessible merely by removing cover plate 72.

Figure 3:
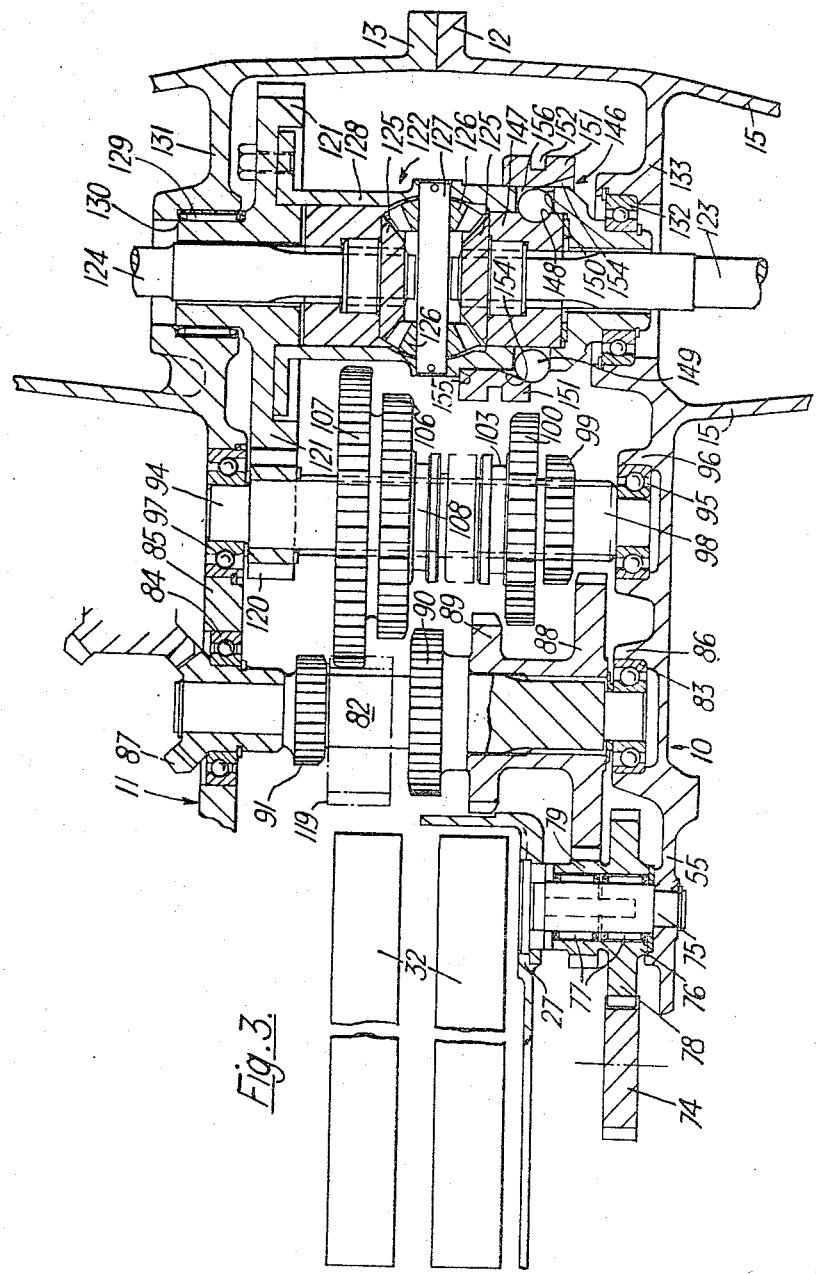
FIG. 3 is a sectional view taken on lines 3—3 of FIG. 4.
Figure 4:
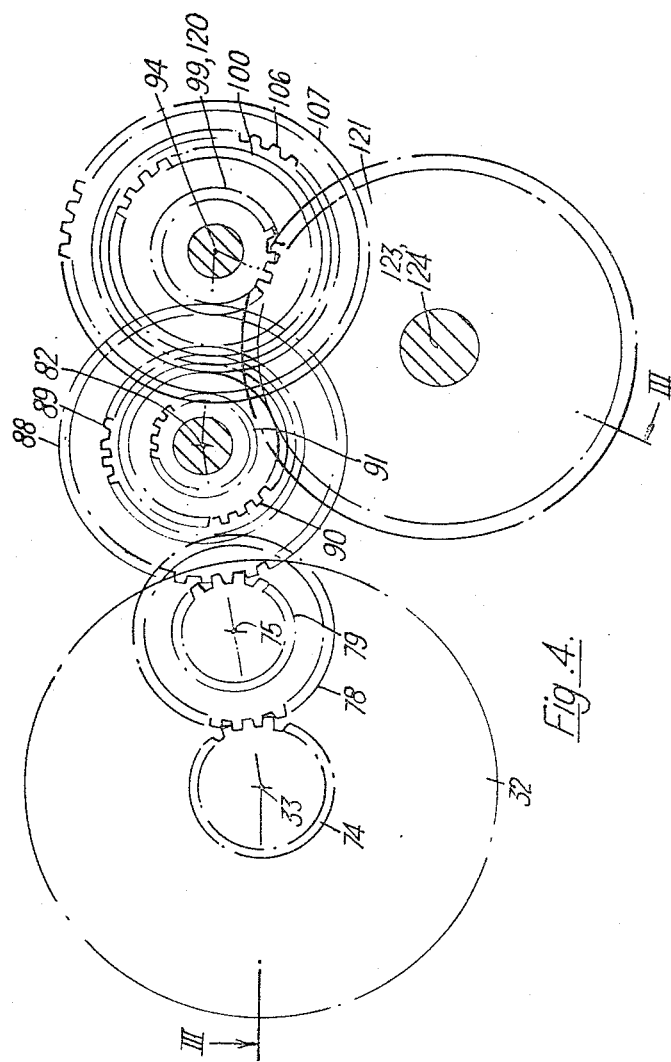
FIG. 4 is a diagrammatic side view showing the relative positions of the shafts of the power unit.

Driven shaft 60 is provided in its inner end with a gear 74 which meshes with a gear 78 as shown in FIGURES 3 and 4. Gear 78 is formed on a tubular shaft 76 which is rotatably mounted on bearings 77 carried on shaft 75. Also integrally formed on shaft 76 is a gear 79. Gears 78 and 79 act as a reduction gear between gear 74 and the transmission. Shaft 75 is mounted transverse to the tractor and is non-rotatably supported in the outer wall 55 and flange 27 of casing 10. It will be noted, from FIGURE 4 that the axes of shafts 75 and 76 are located rearwardly of and slightly above the axis of crankshaft 33.

Figure 7:
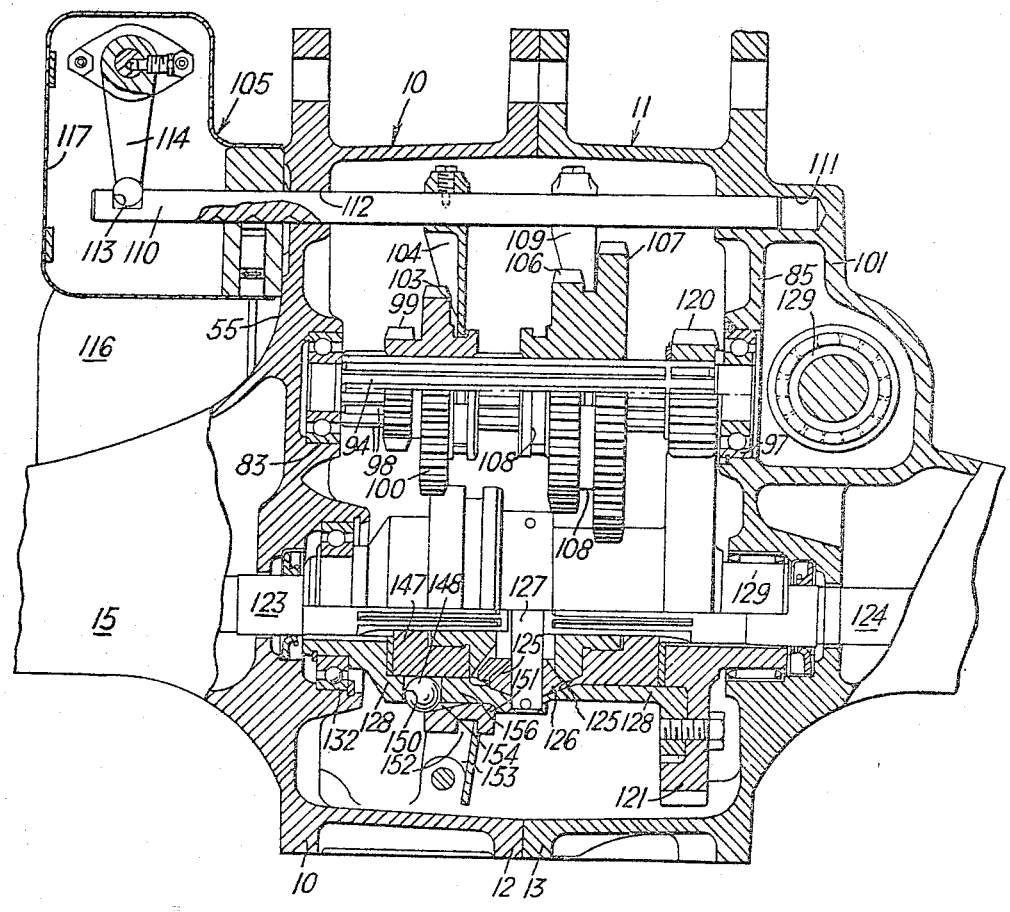
FIG. 7 is a rear elevation, partly in section, of the power unit.

The gear box, or transmission unit, includes a first main shaft or input shaft 82 having its axis disposed transversely to the tractor and situated rearwardly of, and slightly above, the axis of shaft 74. Input shaft 82 is rotatably supported in bearings 83 and 84 located in side wall 55 of casing 10 and side wall 85 of casing 11, respectively. Bearing 83 is located in a recess formed by an inwardly extending flange 86 integrally cast with side wall 55, whereas bearing 84 is supported in side wall 85. Shaft 82 extends through the casing wall and carries a bevel gear 87 at its outer end to provide drive to a power-take-off shaft 129 (FIG. 7). Rigidly attached to shaft 82 for rotation therewith are gears 88, 89, 90 and 91 of varying sizes which act as the driving gears for a four-speed transmission or gear box. Gear 88 also is in constant mesh with gear 79 of the reduction unit to provide a drive to shaft 82.

The transmission is provided with a second main shaft or output shaft 94 also having its axis transversely disposed to the tractor longitudinal axis. Shaft 94 is situated rearwardly of the axis of shaft 82 and is rotatably supported at one end in a bearing 95. Bearing 95 is mounted in an annular flange 96 integrally formed with side wall 55. Shaft 94 has its other end rotatably supported in a bearing 97 located in side wall 85. Bearings 84 and 94, as well as the power-take-off unit driven by gear 87, are enclosed in an extension 101 (FIG. 2) cast integrally with the side wall 85 to protect the power-take-off unit and its associated bearings and gears.

Splines 98 are formed on the outer periphery of shaft 94 on which a pair of integrally formed gears 99 and 100 are slidably mounted. Gears 99 and 100 are mounted on shaft 94 in such a manner that they are rotatable with shaft 94 but at the same time they may slide axially along shaft 94. Integrally formed with gears 99 and 100 is an axial flange which is formed with an annular groove 103 for receiving the fork 104 of a gear shift assembly 105 (FIG. 7). A second pair of gears 106 and 107 are slidable on splines 9 and include a grooved flange 108 engaged by a second fork 109 of the gear shift assembly.

With reference to FIGURES 3 and 7, gear shift assembly 105 includes a pair of selector rods 110, only one of which is shown, one being attached to each of forks 104 and 109. Each selector rod is slidably received at one end in a circular recess 111 formed in side wall 85 of casing 11. The other end of each selector rod passes through an opening 112 in the side wall 55 of casing 10 and is provided with a groove 113 which receives a shift finger 114. Shift finger 114, together with its linkage to gear lever 115 (FIG. 1) is housed in, and is supported by, a bracket 116 and cover plate 117, which in turn are bolted to side wall 55 of casing 10. Gear lever 115 is preferably located in such a position that it is convenient to the driver's left hand.

It is apparent from the foregoing description of the transmission assembly that suitable manipulation of gear shift lever 115 causes gears 94 to be shifted axially of their shafts so that selective ones of the gears may be placed in mesh with the gears of input shaft 82. For example, if gears 91 and 107 are placed in mesh, low gear will be obtained. Second gear is obtained by engagement by gears 90 and 106, third gear by engagement of gears 88 and 100, and high gear by engagement by gears 88 and 99.

In addition to the four forward gears, reverse is obtained by a pinion 119 slidably mounted on a transverse shaft (not shown). In FIGS. 3 and 4, pinion 119 is elongated in an axial direction sufficiently that it can mesh with both gears 91 and 107 whereby reverse rotation of shaft 94 will be obtained. Pinion 119 is slidable under the control of gear lever 115 and a third selector rod from the position shown in FIG. 3 to a position in which it engages gear 91 and 107 to obtain reverse.

Fixed to shaft 94 adjacent wall 85 is a spur gear 120 which is in constant engagement with a spur gear 121 acting as the crown wheel for a differential assembly 122. Differential assembly 122 includes two output shafts 123 and 124 each extending transversely through their associated housings 15 to provide a drive towards the left and right hand wheels of the tractor, respectively. Fixed to the opposed, inner ends of output shafts 123 and 124 is a bevel sun wheel 125. Each sun wheel 125 meshes with differential planets pinions 126 mounted at the ends of a pin 127 which in turn is carried in a cage 128 bolted to the crown wheel 121. Differential assembly 122 is supported at one end on bearings 129 received in an annular opening 130 formed in a rib 131 integrally cast with casing 11. The other end of cage 128 is supported by a bearing 132 received in a hollow boss formed in a rib 133 integrally cast with casing 10.

Figure 8:
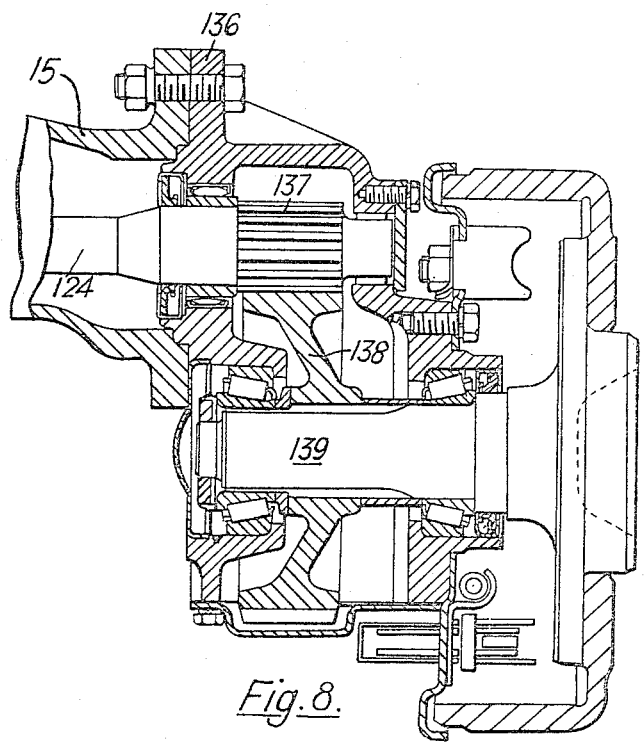
FIG. 8 is a sectional view showing the connection between the differential output and wheel axles.

Shafts 123 and 124 extend outwardly beyond their respective housings 15 into a casing 136 (the right hand casing only being illustrated in FIG. 8). Casing 136 is secured to the end of tubular housing 15 to enclose and rotatably support the outer end of shaft 124. Fixed to the end of shaft 124 is a gear 137 which in turn is engaged with a gear 138 fixedly mounted on a stub axle 139 rotatably supported in casing 136. Tractor wheels 16 (FIG. 1) are mounted on the stub axles 139.

As shown in FIG. 4, the axis of the differential unit plus as well as that of output shafts 123 and 124 is located below, and in front of, the axis of shaft 94. Moreover, input shaft 82 and output shaft 94 of the transmission are located, respectively, in front of and behind a vertical plane passing through the axis of shafts 123 and 124.

It is apparent from the foregoing, that by locating the engine crankshaft 33, as well as gear shift axes 75, 84 and 92 transversely of the tractor, a compact, neat and low-cost transmission arrangement involving only spur gears have been provided.

Moreover, the foregoing arrangement of parts permits the complete assembly to be incased in the housing formed by casings 10 and 11 which are attached together on a single joint located approximately on the longitudinal centerline of the tractor. Consequently, the entire assembly may be made accessible for service simply by removing bolts 14 and the engine block after which the tractor may be split along the longitudinal plane.

Another feature of the invention is a novel differential lock 146 illustrated in FIGS. 3 and 7. Axle shaft 123 has splined near its inner end a circular clutch member 147 rotatable inside planet cage 128 and provided on its periphery with a series of indentations 148. Balls 149, located in cylindrical apertures 150 in the cage 128, may be received in indentations 148. Rotatably supported on the outer periphery of cage 128 is an annular actuating ring 151 connected through the groove 152, lever 153, and a suitable linkage to an actuating lever situated at a convenient point close to the tractor driver.

In FIG. 3 the differential lock is shown in the disengaged position to the left of the shaft 123. Actuating ring 151 is fully retracted and, due to the provision of a chamber 154 on ring 151, balls 149 have retracted from the grooves 148 permitting normal differential action. In this position, ring 151 abuts against a shoulder 155 on the cage 128 to limit its travel so that the ring still partially over-lies apertures 150 to prevent the balls from falling out.

To engage the differential lock, ring 151 is slid into the position shown to the right of the shaft 123. The flat portion 156 of the ring has now engaged the balls and forced them into the indentations 148 so that the shaft 123 is now in effect locked to crown wheel 121 and the two shafts 123 and 124 must rotate in unison, and no differential action is possible.

It is normal, when using a two stroke air cooled engine to use two oil pumps for lubrication. Normally the first pump receives oil from a reservoir and pumps it under pressure to the engine bearings from where the oil passes into the crankcase chamber, while the second pump acts to scavenge the crankcase chamber, and so reduce oil churning losses, finally returning the oil to the reservoir.

In the present invention, the second pump has a filter provided on its suction side and scavenges the chamber 31, and its delivery side is connected to the transmission to provide pressure lubrication of the gears. The first pump also has a filter on its suction side, and thus both pumps can deliver clean oil to the parts they are intended to lubricate. Servicing is also simplified.

In the illustrated embodiment, a single two stage oil pump 160 is employed. Referring now to FIGS. 5 and 6, the oil pump 160 is driven by a skew gear and shaft assembly 161, the skew gear meshing with a gear 162 provided on the crankshaft. The space 163 bounded by the crankshaft housing 27, 29 and 30, side wall 55 of the casing 10, and the lower ends of the casing 10, 11 is utilized as an oil sump. Oil to the first stage of the pump passes through the aperture 164 and filter 165 into the pump from where it passes under pressure through a duct 166 to lubricate the engine and timing gears in the normal manner. From valve chamber 34, the oil passes into the crankcase housing 31 from where it is passed through a duct 170 into the compartment 167 below the pump. This oil then passes through the filter 168 into the second stage of the pump from where it passes under pressure through a duct 169 and through further ducts (not shown) to lubricate the gears and bearings connected with the shafts 75, 82, 94. From there it is then free to drop into the sump 163. The compartment 167 is formed by a cover plate 171 bolted to the lower portion of the housing 11 so that it may easily be removed to allow access to both filters 165, 168 for servicing.

Since the power unit is essentially intended for use in a relatively light tractor the advantage is also obtained that a large proportion of the weight of the engine and transmission is placed on the rear wheels to assist in traction. This latter advantage is enhanced by the disposition of the main gear shafts 82 and 94 one on either side of and above the axis of the rear axle shafts 123, 124. A further feature is that although the shafts 82, 94 are located at a relatively high point the engine crankshaft may be at a relatively low level and the difference in height is compensated for by locating the reduction unit shaft 75 at a height approximately mid-way between the height of the crankshaft 33 and the gear shaft 82.

We claim:

1. A power unit and rear axle assembly for tractors and similar vehicles including an engine crankshaft, a transmission unit, a differential unit, and clutch means for selectively establishing and disestablishing drive between the crankshaft and transmission unit, the improvement wherein the crankshaft, transmission unit, and differential unit are disposed in a single housing removable as a unit from the vehicle and supported on the rear axles of the vehicle to provide maximum traction, said housing comprising a pair of central housing portions with complementary rims, a tubular, generally trumpet shaped shaft housing extending from each of said central housing portions on an axis transverse to the plane of said rims, said housing portions being secured together at said rims to define a central housing having a portion which projects forwardly of the tubular shaft housings, said engine crankshaft being journaled in the forward portion of said housing on an axis parallel with the axes of the tubular shaft housings, said transmission unit being mounted in said housing rearwardly of said crankshaft and disposed in parallel relationship with the axes of said tubular shaft housings, said differential unit being mounted in said central housing beneath said transmission unit and having a pair of output shafts journaled respectively for rotation in said tubular shaft housings, and said engine crankshaft projecting externally of said central housing, the externally projecting portion of said crankshaft carrying said clutch means externally of the housing.

2. The power unit as defined in claim 1 in which the transmission unit includes an input shaft and an output shaft, the axes of the transmission input and output shafts being disposed one on each side of a vertical plane passing through the axes of said tubular shaft housings.

3. A power unit as defined in claim 1 further including a sleeve rotatably mounted on said crankshaft, means drivingly connecting said sleeve to the transmission, and in which said clutch means comprises a friction clutch having a driving member mounted at the end of the crankshaft for rotation therewith, and a driven member mounted on said sleeve for rotation therewith.

4. The power unit defined in claim 3 further including a cover member detachably mounted on said central housing portion and enclosing said friction clutch.

5. A power unit as defined in claim 1 further including an opening in the top wall of the central housing portion for receiving one or more connecting rods from an engine mounted on the central housing portion, such that the connecting rods are engageable with the crankshaft for driving same.

6. A power unit as defined in claim 5 further including a casing mounted on the outer end of each tubular shaft housing, a stub axle rotatably mounted in each of said casings, said differential output shafts each extending into one of said casings, and gearing drivingly connecting said differential output shafts with the associated stub axle.

7. A vehicle power unit comprising a pair of casings detachably connected together along a plane to form a housing, a valve chamber, crankcase chamber, a transmission chamber and an oil sump formed in said housing, a first port connecting said valve chamber and crankcase chamber, a crankshaft rotatably supported in said housing on an axis transverse to said plane and extending into said crankcase chamber and said valve chamber, a two stage oil pump operatively connected with said crankshaft, the first stage of said pump having its outlet connected to said valve chamber, and its inlet connected with said oil sump, the second stage having its inlet connected with said crankcase chamber and its outlet connected with said transmission chamber, and a second port connecting the transmission chamber with said oil sump.

8. A vehicle power unit housing including right and left hand casings detachably connected together along a plane parallel to the longitudinal vertical plane of the vehicle, said casings together enclosing a space for the reception of, and providing supports for supporting an engine crankshaft and transmission shafts with their axes of rotation transverse to the longitudinal plane of the vehicle, each casing having formed integrally therewith an outwardly extending flared portion forming a trumpet housing having a bell and a holow stem, the bells together being adapted to house said engine crankshaft and said transmission shafts, and each hollow stem being adapted to house an axle drive shaft.

9. A vehicle power unit as claimed in claim 7 in which there is a fluid filter in the supply to each of the pump stages.

10. A vehicle power unit comprising; a pair of casings having central housing portions with complementary rims, a tubular shaft housing extending from each of said central housing portions along an axis transverse to the plane of said rims, said casings being secured together at said rims to define a central housing, an engine crankshaft, a transmission unit and a differential unit mounted in said central housing and each disposed in parallel relationship with the axes of said tubular shaft housings, said differential gear unit having a pair of output shafts journalled, respectively, for rotation in said tubular shaft housings, and torque transmitting means for establishing and disestablishing drive from said engine crankshaft to said pair of output shafts through said transmission unit.

11. A vehicle power unit for driving a pair of coaxial wheel axles comprising; a pair of casings having central housing portions with complementary rims, a tubular shaft housing extending from each of said central housing portions along an axis transverse to the plane of said rims, said casings being secured together at said rims to define a central housing, an engine crankshaft, transmission input shaft and transmission output shaft each journalled for rotation in said housing above and parallel to the axes of said tubular shaft housings, a differential gear having an input shaft and a pair of output shafts each extending into one of said tubular shaft housings, means drivingly connecting said transmisssion output shaft with the input shaft of said differential gear, and means for selectively engaging and disengaging said crankshaft with said transmission input shaft.

References Cited by the Examiner
UNITED STATES PATENTS

| | | | |
|---|---|---|---|
| 2,306,545 | 12/1942 | Kummich | 74—701 |
| 2,477,576 | 8/1949 | Buckendale | 74—607 |
| 2,705,056 | 3/1955 | Bruns | 184—6 |
| 2,879,733 | 3/1959 | Pierce | 184—6 |
| 2,913,927 | 11/1959 | Issigonis | 74—701 |

DAVID J. WILLIAMOWSKY, *Primary Examiner.*

H. S. LAYTON, *Assistant Examiner.*